United States Patent [19]

Rathbun et al.

[11] 4,215,828

[45] Aug. 5, 1980

[54] TAPE MEASURE REEL LOCK

[75] Inventors: Richard H. Rathbun, Oakdale; William J. Hildebrandt, West Simsbury, both of Conn.

[73] Assignee: The Stanley Works, New Britain, Conn.

[21] Appl. No.: 32,487

[22] Filed: Apr. 23, 1979

Related U.S. Application Data

[63] Continuation of Ser. No. 869,840, Jan. 16, 1978, abandoned.

[51] Int. Cl.² ............................................. G01B 3/10
[52] U.S. Cl. ................................. 242/84.8; 33/138; 242/99; 403/252
[58] Field of Search ............... 242/84.8, 99, 107.6, 242/107.12, 107.3, 107.2, 84.5 R, 84.53, 129.8, 156, 156.2, 107.4 R; 33/138; 403/252, 254

[56] References Cited

U.S. PATENT DOCUMENTS

| | | | |
|---|---|---|---|
| 974,417 | 11/1910 | Morgan | 242/84.8 |
| 3,001,738 | 9/1961 | Quenot | 242/84.8 |
| 3,241,788 | 3/1966 | Visockis | 242/99 X |
| 3,273,820 | 9/1966 | Quenot | 242/84.8 |

FOREIGN PATENT DOCUMENTS 1144358  3/1969  United Kingdom ............... 403/252

Primary Examiner—John M. Jillions
Attorney, Agent, or Firm—Prutzman, Kalb, Chilton & Alix

[57] ABSTRACT

A tape measure reel lock with a locking slide reciprocably mounted for selectively engaging internal V-shaped, angularly spaced abutments of a reel drum, each abutment having a latching shoulder for locking the reel with the slide against unwinding rotation and a camming shoulder for automatically retracting the slide when the reel is rotated to rewind the measuring tape.

4 Claims, 7 Drawing Figures

U.S. Patent   Aug. 5, 1980   4,215,828
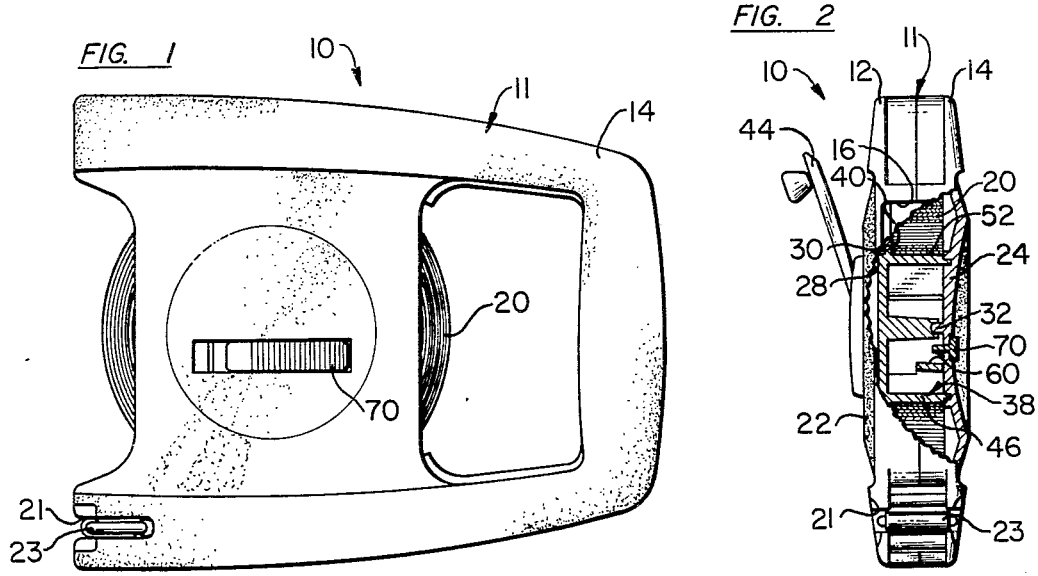
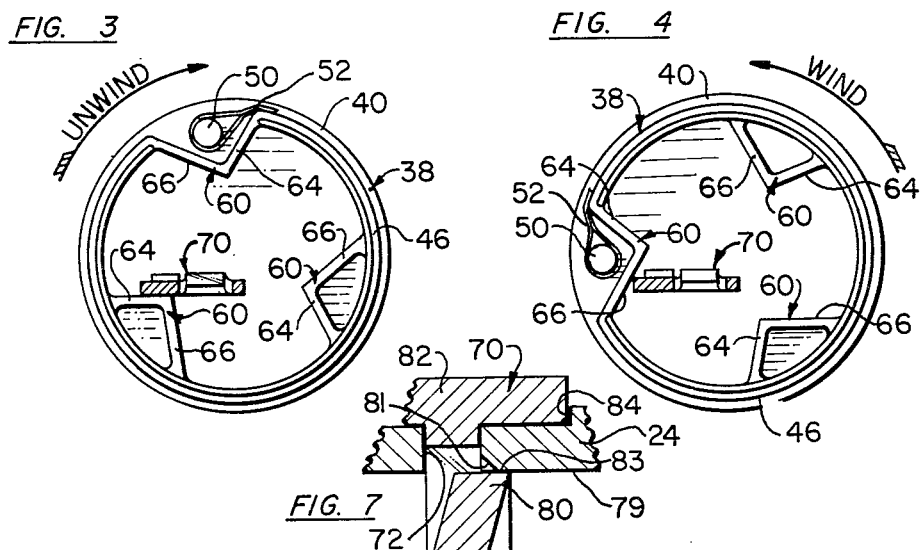
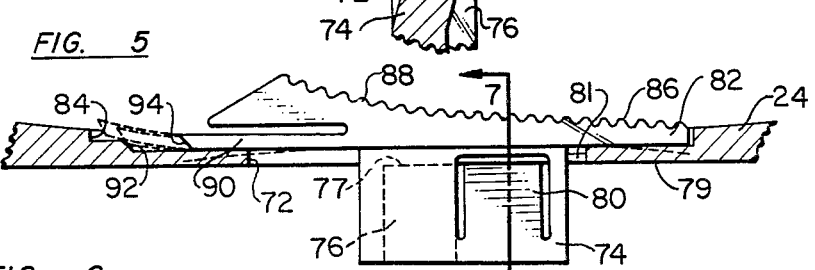
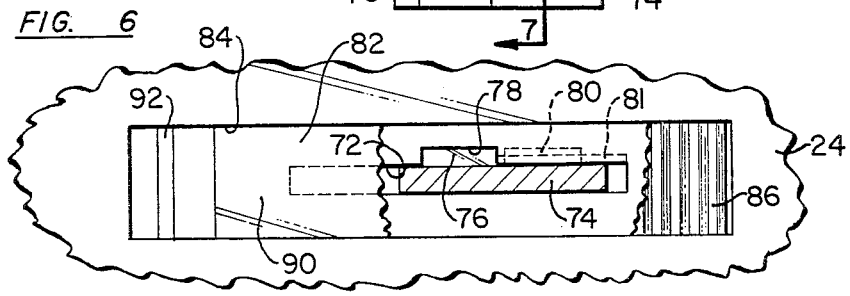

4,215,828

TAPE MEASURE REEL LOCK

This is a continuation, of application Ser. No. 869,840, filed Jan. 16, 1978 now abandoned.

BRIEF SUMMARY OF THE INVENTION

The present invention relates generally to crank operated tape measures and is more particularly concerned with a new and improved reel lock for crank operated tape measures.

It is a principal aim of the present invention to provide in a crank operated tape measure a new and improved reel lock for locking the measuring tape against unwinding after a selected length of tape is unreeled. Included in this aim is the provision of a tape measure reel lock which permits a user, after hooking the free end of the measuring tape at a measuring point, to pull the tape taut with the tape measure case and without having to hold the tape reel crank to keep the tape from paying out.

It is another aim of the present invention to provide a new and improved tape measure reel lock that is automatically disengaged in conjunction with reeling in the measuring tape.

It is another aim of the present invention to provide a new and improved manually operable tape measure reel lock of economical construction which is adapted to be manually operated between locking and unlocking positions and which is frictionally retained in each position against unintended operation.

It is still another aim of the present invention to provide a new and improved tape measure reel lock of the type described that is particularly well suited for long tapes having a length of fifty feet or more.

It is a further aim of the present invention to provide a new and improved tape measure reel lock of economical and yet rugged and durable construction that is well suited to rapid assembly.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWING

In the drawing:

FIG. 1 is a side view of a tape measure incorporating a preferred embodiment of a reel lock of the present invention, showing the measuring tape fully withdrawn;

FIG. 2 is a front end view, partly broken away and partly in section, of the tape measure;

FIGS. 3 and 4 are enlarged section views, partly in section, of a reel and a reel locking slide of the tape measure, showing respectively the reel locked by the slide against paying out the measuring tape and the slide engaged by the reel to release the lock;

FIG. 5 is an enlarged partial section view, partly broken away and partly in section, showing the locking slide in full lines in its withdrawn unlocking position and in part in broken lines in its intermediate and locking positions;

FIG. 6 is an enlarged partial side view, partly broken away and partly in section, of the tape measure showing the locking slide in its withdrawn unlocking position; and FIG. 7 is an enlarged partial transverse section view, partly broken away and partly in section, taken substantially along line 7—7 of FIG. 5.

DESCRIPTION OF THE PREFERRED EMBODIMENT

Referring now to the drawing in greater detail wherein like reference numerals indicate like parts throughout the several figures, a tape measure 10 incorporating a preferred embodiment of the present invention has a case 11 consisting of a pair of mating side members 12, 14 which, in their assembled condition, define an intermediate tape storage cavity 16, open at its front and rear ends, for storing a long measuring tape or blade 20 of, for example, fifty feet long or more. A slotted receptacle 21 for a blade hook 23 is shown provided at the lower front end of the casing 11. The mating side members 12, 14 of the case 11 have sidewalls 22, 24 respectively with slightly concave exterior surfaces at generally central portions thereof. The side member 12 has an enlarged circular central aperture 28 in its sidewall 22 with a radially extending lip 30 defining its periphery. The interior surface of sidewall 24 is provided with a center post 32 projecting a short distance into the interior of the case.

A generally cylindrical cup-shaped molded plastic reel 38 is mounted within the large central aperture 28 of the side member 12 and has a peripheral flange 40 that cooperates with the lip 30 of the side member 12 to prevent withdrawal of the reel from the casing. The reel 38 has a pivotal crank 44 for rotating the reel and rewinding the measuring tape 20 to the reel in a generally conventional manner. The reel 38 has a generally cylindrical skirt or drum 40 that extends across the interior of the case into a coaxial circular groove of the sidewall 24. An axially extending post 50 is provided inwardly of but generally tangential to the outer cylindrical surface of the drum 46 for securing an inner end loop 52 of the tape 20 to the reel 38. Thus, as will be appreciated, the reel 38 can be manually rotated by the crank 14 to wind the measuring tape 20 onto the drum 46 for storage within compartment 16.

In accordance with the present invention, the reel 38 is molded with three equiangularly spaced abutments 60 formed by generally V-shaped webs extending generally radially inwardly from the cylindrical drum 46. As shown in FIGS. 3 and 4, the post 50 is located within a notch defined by one of the generally V-shaped webs 60 which extends inwardly from the circumferentially spaced ends of the drum 46.

Each abutment 60 forms two oppositely angularly facing flat surfaces 64, 66 respectively at its "leading" and "trailing" sides relative to unwinding rotation of the reel 38, in the clockwise direction as viewed in FIGS. 3 and 4. The "leading" abutment surfaces 64 are angularly inclined from a radial to provide a latching surface with substantially face to face engagement with one side of the forward end of a molded plastic locking slide 70 as shown in FIG. 3 for locking the reel 38 against further unwinding rotation.

The locking slide 70 is mounted on the sidewall 24 opposite the crank 44 and within an elongated slot 72 in the sidewall 24. The slide 70 has a generally flat depending locking blade 74 adapted to be inserted into the slot 72. The depending blade 74 has an enlarged section 76 with an upper flat shoulder or edge 77 adjacent to but slightly rearwardly of its forward end, and the slot 72 has an enlarged section 78 for inserting the enlarged locking blade section 76 through the slot 72. Once inserted into the slot 72, the blade 74 is retained within the slot by the engagement of the flat upper shoulder 77 with the inside flat face 79 of the sidewall 24 and by an integral resilient tab 80 having an offset unflexed condition shown in FIG. 7 with an upper flat edge 83 engaging the inside flat face 79 of the sidewall 24. The tabe 80 is made sufficiently resilient to insert the blade 74 through the slot 72 and the tab 80 then snaps outwardly to underlie the sidewall 24. For that purpose, the slot 72 is internally chamfered at 81 to permit the tab 80 to snap outwardly to underlie the sidewall 24 to its relaxed position shown in FIG. 7.

The locking slide 70 has an outer integral base 82 substantially wider than the blade 74 and received within a recess 84 of corresponding width in the sidewall 24. The base 82 is formed with an outer rear button 86 with a generally longitudinally curved transversely serrated face 88 facilitating thumb operation of the slide between its withdrawn unlocking position shown in full lines in FIG. 5 and its fully extended locking position shown in part in broken lines in FIG. 5.

After the desired length of measuring tape 20 is payed out, the reel 38 can be locked to prevent further pay out of the tape 20 by manually shifting the locking slide 70 to its fully forward position where the forward end of locking slide 70 has face to face engagement with "leading" surface 64 of an abutment 64. As locking slide 70 is so shifted, the forwardly extending cantilever leaf spring member 90 of the slide 70 rides up over an inclined shoulder or ramp 92 formed in the sidewall 24. The spring force of the cantilever spring member 90 is effective in causing the friction between the slide and the tape casing to retain the slide in its fully forward locking position. The slide 70 is formed with the cantilever spring member 90 and the rear relatively thin wall section of the button 86 bowed slightly downwardly in their relaxed state, as shown in part in broken lines in FIG. 5, to increase the spring force of the cantilever spring member 90. The forward end 94 of the cantilever spring member 90 is tapered and the ramp 92 is tapered to facilitate shifting the locking slide 70 to its fully forward locking position.

The "trailing" abutment edge 66 of each abutment 60 is angularly inclined to a radial to provide for engaging the forward end of the locking blade 74 of the slide 70 and cam the locking slide 70 rearwardly as the reel 38 is rotated, in the counterclockwise direction as viewed in FIGS. 3 and 4, to rewind the tape 20 onto the reel 38. Upon reference to FIG. 4, it can be seen how the "trailing" cam edge 66 is effective in automatically retracting the locking slide 70. Also, when the locking slide 70 is cammed to an intermediate locking position in which the locking slide just clears the abutment 60, the tapered forward end 94 of the cantilever leaf spring 90 is in engagement with the ramp 92 to provide, in combination with the stored energy of cantilever leaf spring 90, a snap action return of the slide to its fully retracted position where it is positively spaced from the abutment 60 by a small clearance. The slope of fixed ramp 92 is slightly greater than the taper of end 94 of spring member 90 to facilitate this action.

Accordingly, it can be seen that the reel 38 can be selectively locked in any one of three equiangularly spaced angular positions with the three abutments 60 by selective manual operation of the locking slide 70. The locking slide 70 is frictionally retained in its fully forward locking position and whereby the case alone can be held with one hand for making the tape taut. Thereafter, when the reel is manually rotated to reel in the measuring tape 20, the locking slide 70 is automatically returned to its fully retracted position.

As will be apparent to persons skilled in the art, various modifications, adaptations and variations of the foregoing specific disclosure can be made without departing from the teachings of the present invention.

We claim:

1. In a crank operated tape measure having a case with spaced sidewalls, a rotatable reel with a generally cylindrical drum extending between the spaced sidewalls and a crank at one axial end thereof for rotating the reel, a measuring tape with an inner end secured to the reel for being wound onto the drum by rotation of the reel in one angular direction, and a reel lock for selectively locking the reel against rotation in at least the opposite angular direction, the improvement wherein the reel lock comprises an elongated locking slide, the case sidewall at the opposite axial end of the drum from the reel crank having an elongated slot and the locking slide having an elongated blade extending through the elongated slot and being manually reciprocable along the slot in first forward and second rearward opposite directions to locking and unlocking positions thereof respectively, the reel having integral abutment means with a latching shoulder engageable by the locking slide blade with the locking slide in its locking position for locking the reel against rotation in said opposite angular direction against paying out the measuring tape from the reel and a second camming shoulder for camming the locking slide in said second direction from its locking position upon rotation of the reel in said one angular direction, the locking slide having a longitudinally forwardly extending cantilever leaf spring engageable with said opposite sidewall, and said opposite sidewall having an inclined ramp engageable by the forward end of the leaf spring as the locking slide is shifted in said first forward direction from its unlocking position to an intermediate position between its unlocking and locking positions, the said ramp and leaf spring cooperating to snap return the slide to its unlocking position when the slide is cammed in said second direction to its said intermediate position by the camming shoulder.

2. In a crank operated tape measure having a case with spaced sidewalls, a rotatable reel with a generally cylindrical drum extending between the spaced sidewalls and a crank at one axial end thereof for rotating the reel, a measuring tape with an inner end secured to the reel for being wound onto the drum by rotation of the reel in one angular direction, and a reel lock for selectively locking the reel against rotation in at least the opposite angular direction, the improvement wherein the reel lock comprises an elongated molded plastic locking slide, the case sidewall at the opposite axial end of the drum from the reel crank having an elongated slot opening therethrough and the locking slide having an elongated integrally molded blade extending through the elongated slot opening and being manually reciprocable along the slot opening in first forward and second rearward opposite directions to locking and unlocking positions thereof respectively, the locking slide blade being adapted to be inserted through the slot opening in said opposite sidewall for installing the locking slide thereon, and the blade having integrally molded retaining means for retaining the inserted blade from withdrawal through the slot opening, the reel having integral abutment means with a latching shoulder engageable by the locking slide blade with the locking slide in its locking position for locking the reel against rotation in said opposite angular direction against paying out the measuring tape from the reel and a second camming shoulder for camming the locking slide in said second direction from its locking position upon rotation of the reel in said one angular direction, the locking slide having a longitudinally forwardly extending cantilever leaf spring engageable with said opposite sidewall, and said opposite sidewall having an inclined ramp engageable by the forward end of the leaf spring as the locking slide is shifted in said first forward direction from its unlocking position to an intermediate position between its unlocking and locking positions, the said ramp and leaf spring cooperating to snap return the slide to its unlocking position when the slide is cammed in said second direction to its said intermediate position by the camming shoulder.

3. A crank operated tape measure according to claim 2 wherein the integrally molded retaining means of the locking slide blade comprises retaining lug means between the spaced sidewalls having outer shoulder means engageable with said opposite sidewall for retaining the locking slide against outward withdrawal from the slot opening.

4. A crank operated tape measure according to claim 2 wherein the generally cylindrical drum is formed by a generally annular web and wherein the integral abutment means is formed by a web which extends generally radially inwardly from the generally annular web.

* * * * *